(12) United States Patent
Tsubaki et al.

(10) Patent No.: US 12,293,880 B2
(45) Date of Patent: May 6, 2025

(54) ELECTROLYTIC CAPACITOR

(71) Applicant: Panasonic Intellectual Property Management Co., Ltd., Osaka (JP)

(72) Inventors: Yuichiro Tsubaki, Kyoto (JP); Tatsuji Aoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 267 days.

(21) Appl. No.: 18/045,654

(22) Filed: Oct. 11, 2022

(65) Prior Publication Data

US 2023/0109930 A1   Apr. 13, 2023

Related U.S. Application Data

(63) Continuation of application No. 17/155,644, filed on Jan. 22, 2021, now Pat. No. 11,508,530, which is a
(Continued)

(30) Foreign Application Priority Data

Sep. 28, 2015   (JP) ................................ 2015-189454

(51) Int. Cl.
*H01G 9/145* (2006.01)
*H01G 9/00* (2006.01)
(Continued)

(52) U.S. Cl.
CPC ........... *H01G 9/145* (2013.01); *H01G 9/0032* (2013.01); *H01G 9/0036* (2013.01); *H01G 9/025* (2013.01);
(Continued)

(58) Field of Classification Search
CPC .... H01G 9/145; H01G 9/0032; H01G 9/0036; H01G 9/025; H01G 9/028; H01G 9/035; H01G 9/0003; H01G 9/055; H01G 9/07
See application file for complete search history.

(56) References Cited

U.S. PATENT DOCUMENTS

2004/0023121 A1\* 2/2004 Nakamura ............. H01G 9/028
 525/410
2010/0024182 A1\* 2/2010 Shimamoto ............ H01G 13/00
 29/25.42
(Continued)

FOREIGN PATENT DOCUMENTS

CN 102763181 A 10/2012
JP S62-268121 A 11/1987
(Continued)

OTHER PUBLICATIONS

English Translation of Chinese Search Report dated Mar. 5, 2019 for the related Chinese Patent Application No. 201680055218.4.
(Continued)

*Primary Examiner* — Michael P McFadden
(74) *Attorney, Agent, or Firm* — Rimon P.C.

(57) ABSTRACT

An electrolytic capacitor includes an anode body having a dielectric layer; a solid electrolyte layer in contact with the dielectric layer of the anode body; and an electrolytic solution. The electrolytic solution contains a solvent and a solute. The solvent contains a glycol compound. The solute contains an acid component and a base component. A mass of the acid component in the solute is greater than a mass of the base component in the solute. The acid component contains a first aromatic compound having a hydroxyl group.

13 Claims, 1 Drawing Sheet

Related U.S. Application Data continuation of application No. 16/703,080, filed on Dec. 4, 2019, now Pat. No. 10,937,601, which is a continuation of application No. 15/915,109, filed on Mar. 8, 2018, now Pat. No. 10,535,472, which is a continuation of application No. PCT/JP2016/004271, filed on Sep. 20, 2016.

(51) Int. Cl.
*H01G 9/025* (2006.01)
*H01G 9/028* (2006.01)
*H01G 9/035* (2006.01)
*H01G 9/055* (2006.01)
*H01G 9/07* (2006.01)

(52) U.S. Cl.
CPC ............ *H01G 9/028* (2013.01); *H01G 9/035* (2013.01); *H01G 9/0003* (2013.01); *H01G 9/055* (2013.01); *H01G 9/07* (2013.01)

(56) References Cited

U.S. PATENT DOCUMENTS

| | | | | |
|---|---|---|---|---|
| 2010/0182734 A1* | 7/2010 | Ning | ............... | H01G 9/0036 427/80 |
| 2011/0250503 A1* | 10/2011 | Wilson | ............... | H01M 10/052 429/207 |
| 2012/0300368 A1* | 11/2012 | Matsuura | ............... | H01G 9/145 361/506 |
| 2015/0213962 A1 | 7/2015 | Koseki et al. | | |
| 2015/0287540 A1 | 10/2015 | Koseki et al. | | |
| 2016/0064151 A1 | 3/2016 | Matsuura et al. | | |
| 2016/0141110 A1* | 5/2016 | Djebara | ............... | H01G 9/008 29/25.03 |
| 2016/0355636 A1* | 12/2016 | Sugihara | ............... | H01G 9/0036 |

FOREIGN PATENT DOCUMENTS

| | | |
|---|---|---|
| JP | H10-106895 A | 4/1998 |
| JP | 2000-182898 A | 6/2000 |
| JP | 2002-324732 A | 11/2002 |
| JP | 2006-114540 A | 4/2006 |
| JP | 2016-021453 A | 2/2016 |
| TW | 201440102 A | 10/2014 |
| WO | 2011/099261 A1 | 8/2011 |
| WO | 2014/021333 A1 | 2/2014 |

OTHER PUBLICATIONS

International Search Report of PCT application No. PCT/JP2016/004271 dated Dec. 6, 2016.
Notice of Allowance issued in corresponding U.S. Appl. No. 15/915,109, dated Sep. 17, 2019.
Non-Final Office Action issued in corresponding U.S. Appl. No. 15/915,109, dated Mar. 28, 2019.
Non-Final Office Action issued in corresponding U.S. Appl. No. 16/703,080 dated Jan. 23, 2020.
Final Office Action issued in corresponding U.S. Appl. No. 16/703,080 dated Jul. 10, 2020.
Notice of Allowance issued in corresponding U.S. Appl. No. 16/703,080 dated Oct. 22, 2020.
Non-Final Office Action issued in corresponding U.S. Appl. No. 17/155,644 dated Mar. 7, 2022.
Notice of Allowance issued in corresponding U.S. Appl. No. 17/155,644 dated Jul. 13, 2022.

* cited by examiner

ELECTROLYTIC CAPACITOR

This application is a Continuation of U.S. patent application Ser. No. 17/155,644 filed on Jan. 22, 2021, which is a Continuation of U.S. patent application Ser. No. 16/703,080, now U.S. Pat. No. 10,937,601, filed on Dec. 4, 2019, which is a Continuation of U.S. patent application Ser. No. 15/915,109, now U.S. Pat. No. 10,535,472, filed on Mar. 8, 2018, which is a Continuation of International Application No. PCT/JP2016/004271 filed on Sep. 20, 2016, which in turn claims the benefit of Japanese Application No. 2015-189454 filed on Sep. 28, 2015, the disclosures of which are incorporated in their entirety by reference herein.

BACKGROUND

1. Technical Field

The present disclosure relates to an electrolytic capacitor including a solid electrolyte layer and an electrolytic solution.

2. Description of the Related Art

As small-sized, large capacitance, and low equivalent series resistance (ESR) capacitors, promising candidates are electrolytic capacitors including an anode body on which a dielectric layer is formed, a solid electrolyte layer formed so as to cover at least a part of the dielectric layer, and an electrolytic solution.

For the solid electrolyte layer, a π-conjugated conductive polymer is used. From the viewpoint of improving withstand voltage characteristics of the electrolytic capacitor, it has been proposed that a solvent containing ethylene glycol and γ-butyrolactone is used as an electrolytic solution (see PCT International Publication No. WO 2014/021333). In addition, it has been proposed that an antioxidant is added to an electrolytic solution for increasing a sparking voltage (see Unexamined Japanese Patent Publication No. 2006-114540).

SUMMARY

An electrolytic capacitor according to an aspect of the present disclosure includes an anode body having a dielectric layer; a solid electrolyte layer in contact with the dielectric layer of the anode body; and an electrolytic solution. The electrolytic solution contains a solvent and a solute. The solvent contains a glycol compound. The solute contains an acid component and a base component. A mass of the acid component in the solute is greater than a mass of the base component in the solute. The acid component contains a first aromatic compound having a hydroxyl group.

According to the present disclosure, there can be provided an electrolytic capacitor that is excellent in withstand voltage characteristics and heat resistance, and can maintain low ESR.

DETAILED DESCRIPTION OF EMBODIMENT

Figure 1:
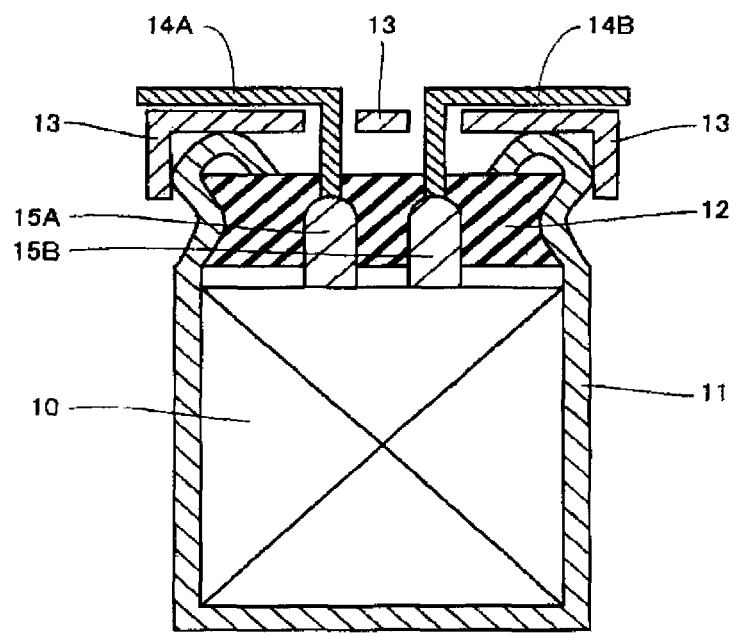
FIG. 1 is a schematic sectional view illustrating an electrolytic capacitor according to an exemplary embodiment of the present disclosure.

The electrolytic capacitor is required to have low ESR, a heat resistance and so on in addition to withstand voltage characteristics. From the viewpoint of improving voltage resistance and heat resistance, it is preferable that a solute of an electrolytic solution contains an acid, and that a glycol compound is used as a solvent of the electrolytic solution. However, when a glycol compound is used as the solvent, ESR tends to rapidly increase earlier than expected under a long-term load test conducted at 100° C. or higher although low ESR is exhibited in an initial stage.

In view of the foregoing, the present disclosure provides an electrolytic capacitor that is excellent in withstand voltage characteristics and heat resistance, and can maintain low ESR.

The electrolytic capacitor according to the present disclosure includes an anode body having a dielectric layer; a solid electrolyte layer in contact with the dielectric layer; and an electrolytic solution. The electrolytic solution contains a solvent and a solute. The solvent contains a glycol compound. The solute contains an acid component and a base component. In this regard, however, a mass of the acid component in the solute is greater than a mass of the base component in the solute. The acid component contains a first aromatic compound having a hydroxyl group.

Orientation or crystallinity of a conductive polymer included in the solid electrolyte layer can be increased by containing the glycol compound in the solvent. An increase in the orientation and the crystallinity of a conductive polymer improves conductivity of the solid electrolyte layer so that ESR of the electrolytic capacitor can be reduced. Contactivity between the solid electrolyte layer and the dielectric layer is improved so that withstand voltage characteristics can be also improved. The conductive polymer is considered to be swollen by the glycol compound. A swollen conductive polymer is likely to cause rearrangement, so that orientation or crystallinity of the conductive polymer is considered to be improved.

According to the above-described configuration, improvement of heat resistance or ripple resistance of the electrolytic capacitor can also be expected. This is because the glycol compound hardly volatilizes to dissipate from the electrolytic capacitor to outside. It is considered that the electrolytic solution volatilizes to dissipate at a sealed portion of the electrolytic capacitor, but the glycol compound hardly passes through the sealed portion.

The proportion of the glycol compound contained in the solvent is preferably 50% by mass or more, more preferably 60% by mass or more, still more preferably 70% by mass or more. When the electrolytic solution contains the glycol compound as a main solvent, an effect of reducing ESR of the electrolytic capacitor and an effect of improving heat resistance are enhanced.

The glycol compound preferably contains at least ethylene glycol. In addition, when the solvent contains plural kinds of glycol compounds, ethylene glycol is preferably a main component among the glycol compounds. Since ethylene glycol has low viscosity among glycol compounds, ethylene glycol easily dissolves a solute. Further, since ethylene glycol has high heat conductivity, ethylene glycol exhibits excellent heat dissipation when a ripple current has occurred. Thus, ethylene glycol has a large effect of improving the heat resistance.

The proportion of ethylene glycol in the glycol compound is preferably 30% by mass or more, further preferably 50% by mass or more, further 70% by mass or more, and 100% by mass of the glycol compound may be constituted by ethylene glycol.

The glycol compound may contain, for example, diethylene glycol, triethylene glycol, propylene glycol, polyethylene glycol having a molecular weight of from 190 to 400, inclusive, and the like in addition to ethylene glycol. For example, polyethylene glycol having a molecular weight of from 200 to 300, inclusive, may constitute 3% by mass or more and 25% by mass or less of the solvent. By these configuration, heat resistance of the electrolytic capacitor can be further improved.

The acid component initially decreases pH (potential of hydrogen) of the electrolytic solution, so that dedoping of a dopant from a conductive polymer is suppressed. Dedoping of a dopant from the conductive polymer is considered to be one of causes for deterioration of the solid electrolyte layer. The deterioration of the solid electrolyte layer tends to increase the ESR, and decrease the breakdown voltage. In order to suppress deterioration of the solid electrolyte layer, a mass of the acid component in a solute is need to be greater than a mass of the base component in the solute. More specifically, a content ratio of the acid component in the solute is required to exceed 100 parts by mass with respect to 100 parts by mass of the base component, and preferably 130 parts by mass or more.

However, even when the electrolytic solution includes the acid component more than the base component, it is difficult to stabilize the conductive polymer for a long period of time if the solvent contains a glycol compound. In this case, ESR tends to rapidly increase earlier than expected.

With regard to this problem, by containing the first aromatic compound having a hydroxyl group in the solute, it is possible to keep the ESR of the electrolytic capacitor low not only initially but also for a long period of time. The reason is considered to be because the hydroxyl group of the first aromatic compound has an effect of stabilizing the conductive polymer for a long period of time. This effect is considered to be related to the fact that the hydroxyl group of the first aromatic compound exhibits mild acidity, and/or the fact that the hydroxyl group of the first aromatic compound is less likely to cause a side reaction such as an esterification reaction to proceed because the hydroxyl group of the first aromatic compound is stable.

The acid component may contain a carboxylic acid in addition to the first aromatic compound. However, when an insufficient amount of carboxylic acid is used in combination with the first aromatic compound, the effect of suppressing the increase in ESR due to the first aromatic compound may be decreased in some cases. In addition, from the viewpoint of improving the initial property and the long-term property while suppressing progress of the side reaction, the first aromatic compound preferably accounts for a significant proportion in the acid component. For example, the proportion of the first aromatic compound in the acid component preferably ranges from 30% by mass to 100% by mass, inclusive, more preferably ranges from 36% by mass to 100% by mass, inclusive.

In order to suppress the increase in ESR when the electrolytic solution contains no first aromatic compound, a large amount of carboxylic acid needs to be added in the electrolytic solution. In this case, a carboxylic acid that is at least twice or more as large in mass as the base component is needed. In consideration of the suppression of the side reaction and the reduction of raw material cost, it is preferable to use the first aromatic compound in place of using a large amount of carboxylic acid in many aspects.

An aromatic ring of the first aromatic compound is preferably a C6 benzene ring or a C10 naphthyl ring from the viewpoint of suppressing an increase in viscosity of the electrolytic solution. In addition, the first aromatic compound preferably has one or more phenolic hydroxyl groups bonded directly to the aromatic ring for securing long-term stability. And the first aromatic compound preferably includes, for example, phenol, dibutylhydroxyltoluene, cresol, methoxyphenol, eugenol, guaiacol, thymol, catechol, pyrogallol, or the like. Among these compounds, divalent to tetravalent phenolic compounds which have two to four phenolic hydroxyl groups are preferably used as the first aromatic compound. More specifically, it is more preferable to use at least one selected from the group consisting of catechol and pyrogallol as the first aromatic compound. Further, pyrogallol is especially preferable because it is moderately acidic. And it is preferable that 90% by mass or more of the first aromatic compound is constituted by pyrogallol.

Among aromatic compounds having a phenolic hydroxyl group, an aromatic compound having a carboxyl group bonded directly to an aromatic ring exhibits relatively strong acidity due to the carboxyl group. In particular, an aromatic compound having a carboxyl group at an ortho-position adjacent to the hydroxyl group (for example, salicylic acid) exhibits strong acidity. Although the reason is not clear, use of such an aromatic compound fails to have any effect of stabilizing the conductive polymer over a period of time, and thus it is difficult to suppress the increase in ESR for a long period of time. Therefore, the first aromatic compound is required to be an aromatic compound having no carboxyl group bonded directly to an aromatic ring.

From the viewpoint of further improving heat resistance of the electrolytic capacitor, and further suppressing deterioration of the solid electrolyte layer, the proportion of the first aromatic compound in the electrolytic solution preferably ranges from 0.1% by mass to 30% by mass, inclusive, more preferably from 2% by mass to 25% by mass, inclusive. In addition, from the same viewpoint, the proportion of the first aromatic compound in a total of the solute preferably ranges from 20% by mass to 95% by mass, inclusive, more preferably from 30% by mass to 90% by mass, inclusive.

The pH of the electrolytic solution is preferably 6 or less, more preferably 4 or less, still more preferably 3.8 or less, or 3.6 or less. When the pH of the electrolytic solution is 4 or less, deterioration of the conductive polymer is further suppressed. Generally, it is considered that an anode body is corroded when the pH of an electrolytic solution is 4 or less. However, when the above-mentioned electrolytic solution is used, corrosion of the anode body is also suppressed. Further, the pH of the electrolytic solution is more preferably 2.0 or more.

As the carboxylic acid that can be used in combination with the first aromatic compound, an aromatic compound which has no phenolic hydroxyl group, and has two or more carboxyl groups (second aromatic compound) is preferable. The carboxyl group of the second aromatic compound is relatively stable, so that a side reaction hardly proceeds. The second aromatic compound exhibits an effect of stabilizing the conductive polymer over a relatively long period of time. The second aromatic compound is moderately acidic in the electrolytic solution, so that the anode body is less likely damaged by corrosion.

An aromatic ring of the second aromatic compound is preferably a C6 benzene ring or a C10 naphthyl ring from the viewpoint of suppressing an increase in viscosity of the electrolytic solution. In addition, the second aromatic compound is preferably a divalent to tetravalent carboxylic acid because it is moderately acidic. More preferably, the second aromatic compound has at least two or more carboxyl groups bonded directly to an ortho-position of the aromatic ring because the carboxyl group is easily stabilized. More specifically, it is more preferable to use at least one selected from the group consisting of o-phthalic acid and pyromellitic acid as the second aromatic compound. Further, o-phthalic acid is especially preferable because the carboxyl group is easily stabilized, thereby exhibiting the effect of stabilizing the conductive polymer over a longer period of time. And it is preferable that 90% by mass or more of the second aromatic compound is constituted by o-phthalic acid.

A part of the carboxylic acid may be derived from a salt of the carboxylic acid component and the base component. That is, a salt of the carboxylic acid and the base component may be used as a part of the solute. By using such a salt, an effect that a degree of dissociation of the carboxylic acid is improved can be obtained. For example, 10% by mass or more and 50% by mass or less of the carboxylic acid is preferably derived from a salt of the carboxylic acid component and the base component.

The base component is preferably at least one selected from the group consisting of a primary amine, a secondary amine, and a tertiary amine. By using an amine component, particularly primary to tertiary amine, an effect of stabilizing ESR for a long period of time is enhanced. Although a quaternary amine may be used, from the viewpoint of suppressing a side reaction as much as possible, primary to tertiary amines are preferable because they are moderately basic. As each of the amines, it is possible to use an aliphatic amine, an aromatic amine, and a heterocyclic amine. However, an aliphatic amine having a molecular weight ranging from 72 to 102, inclusive, is preferable because such an aliphatic amine has a high degree of dissociation.

Examples of the primary to tertiary amine include methyl amine, dimethyl amine, trimethyl amine, ethyl amine, diethyl amine, triethyl amine, ethylene diamine, N,N-diisopropylethyl amine, tetramethylethylene diamine, hexamethylene diamine, spermidine, spermine, amantadine, aniline, phenethylamine, toluidine, pyrrolidine, piperidine, piperazine, morpholine, imidazole, pyridine, pyridazine, pyrimidine, pyrazine, and 4-dimethylaminopyridine. These amines may be used alone, or two or more of the amines may be used in combination. Among these amines, tertiary amines such as triethyl amine and monoethyldimethyl amine are particularly preferable.

The proportion of the solute in the electrolyte solution preferably ranges 2% by mass to 32% by mass, inclusive, more preferably from 2% by mass to 10% by mass from the viewpoint of easily achieving the effect of suppressing deterioration of the solid electrolyte layer for a long period of time. For example, the proportion of a total of the first aromatic compound, the base component, and the carboxylic acid (or second aromatic compound) in the electrolytic solution preferably ranges from 2% by mass to 32% by mass, inclusive, more preferably from 2% by mass to 10% by mass, inclusive.

The content ratio of the carboxylic acid preferably exceeds 200 parts by mass with respect to 100 parts by mass of the base component. However, an excess of carboxylic acid reduces the merit of using the first aromatic compound. Therefore, the content ratio of the carboxylic acid is preferably 500 parts by mass or less with respect to 100 parts by mass of the base component.

In addition, the proportion of the carboxylic acid or the second aromatic compound in the entire solute is preferably 60% by mass or less, more preferably 50% by mass or less. By this configuration, the side reaction is suppressed, and thus, for example, it is possible to reduce an amount of water increased in the electrolytic capacitor during a long time use.

The solvent may contain, for example, a sulfone compound, a lactone compound, a carbonate compound, and the like in addition to the glycol compound. As the sulfone compound, sulfolane, dimethyl sulfoxide, diethyl sulfoxide, and the like can be used. As the lactone compound, γ-butyrolactone, γ-valerolactone, and the like can be used. As the carbonate compound, dimethyl carbonate (DMC), diethyl carbonate (DEC), ethyl methyl carbonate (EMC), ethylene carbonate (EC), propylene carbonate (PC), fluoroethylene carbonate (FEC), and the like can be used. These compounds may be used alone, or the multiple types of compounds may be used in combination.

The solid electrolyte layer may be formed by a method that chemical polymerization or electrolytic polymerization is performed on the dielectric layer by applying a solution containing, for example, a monomer, a dopant, and an oxidant to the dielectric layer. However, the solid electrolyte layer is preferably formed by a method that the conductive polymer is applied to the dielectric layer from the reason that excellent withstand voltage characteristics can be expected. More specifically, the solid electrolyte layer is preferably formed by impregnating the dielectric layer with a polymer dispersion containing a liquid component and the conductive polymer dispersed in the liquid component (particularly, a polymer dispersion containing the conductive polymer and the polymer dopant) so as to form a film that covers at least a part of the dielectric layer, and then volatilizing the liquid component from the film. The electrolytic solution described above is particularly effective for suppressing deterioration of the conductive polymer contained in the polymer dispersion, and is also effective for improving the orientation of the conductive polymer.

A concentration of the conductive polymer in the polymer dispersion is preferably from 0.5% by mass to 10% by mass, inclusive. For example, an average particle diameter D50 of the conductive polymer is preferably from 0.01 μm to 0.5 μm, inclusive. Here, the average particle diameter D50 is a median diameter in a volume particle size distribution obtained by a particle size distribution measuring apparatus according to dynamic light scattering. The polymer dispersion having such a concentration is suitable for forming a solid electrolyte layer having an appropriate thickness and is easily impregnated into the dielectric layer.

The conductive polymer included in the solid electrolyte layer is preferably, for example, polypyrrole, polythiophene, or polyaniline. These conductive polymers may be used alone, or two or more of the conductive polymers may be used in combination, or a copolymer of two or more monomers may be adopted. The solid electrolyte layer including such a conductive polymer can be expected to further improve the withstand voltage characteristics.

In the present specification, polypyrrole, polythiophene, polyaniline, and the like mean polymers having, as a basic skeleton, polypyrrole, polythiophene, polyaniline, and the like, respectively. Therefore, polypyrrole, polythiophene, polyaniline, and the like also include derivatives of polypyrrole, polythiophene, polyaniline, and the like, respectively. For example, polythiophene includes poly(3,4-ethylenedioxythiophene) (PEDOT) and the like.

The weight average molecular weight of the conductive polymer is not particularly limited and ranges, for example, from 1000 to 100000, inclusive.

From the viewpoint of suppressing the dedoping of a dopant from the conductive polymer, the solid electrolyte layer preferably includes a polymer dopant. Examples of the polymer dopant include a polyanion of, for example, polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These polyanions may be used alone, or two or more of the polyanions may be used in combination. These polymer dopants may be a homopolymer or a copolymer of two or more monomers. Especially, polystyrenesulfonic acid (PSS) is preferable.

The weight average molecular weight of the polymer dopant is not particularly limited and preferably ranges, for example, from 1000 to 100000, inclusive, from the viewpoint of facilitating formation of a homogeneous solid electrolyte layer.

Hereinafter, the present disclosure is more specifically described with reference to the exemplary embodiment. The exemplary embodiment described below, however, is not to be considered to limit the present disclosure.

Figure 2:
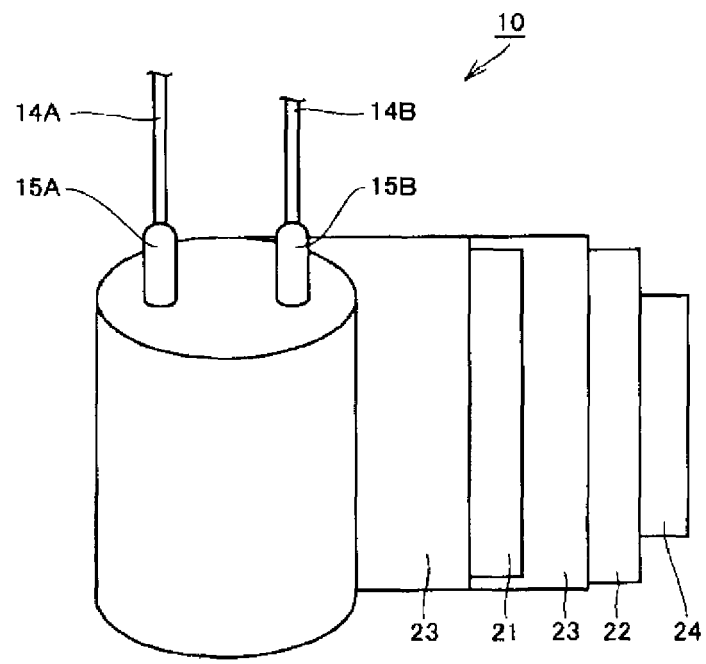
FIG. 2 is a schematic view for explaining a configuration of a capacitor element according to the present disclosure.

FIG. 1 is a schematic sectional view illustrating the electrolytic capacitor according to the present exemplary embodiment, and FIG. 2 is a schematic view obtained by developing a part of a capacitor element according to the electrolytic capacitor.

The electrolytic capacitor includes, for example, capacitor element 10, bottomed case 11 that houses capacitor element 10, sealing member 12 that seals an opening of bottomed case 11, base plate 13 that covers sealing member 12, lead wires 14A, 14B that are lead out from sealing member 12 and penetrate base plate 13, lead tabs 15A, 15B that connect the lead wires to electrodes of capacitor element 10, respectively, and an electrolytic solution (not shown). Bottomed case 11 is, at a part near an opening end, processed inward by drawing, and is, at the opening end, curled to swage sealing member 12.

Sealing member 12 is formed of an elastic material containing a rubber component. As the rubber component, there can be used a butyl rubber (IIR), a nitrile rubber (NBR), an ethylene propylene rubber, an ethylene propylene diene rubber (EPDM), a chloroprene rubber (CR), an isoprene rubber (IR), a Hypalon (trademark) rubber, a silicone rubber, and a fluorine-containing rubber. Sealing member 12 may contain fillers such as carbon black and silica.

In design of the electrolytic solution, it is necessary to consider volatilization of the electrolytic solution to outside through sealing member 12 that forms a sealed portion. In this respect, the electrolytic solution according to the present exemplary embodiment contains the glycol compound, and therefore hardly passes through the sealed portion even at a high temperature. Accordingly, an electrolytic capacitor having excellent heat resistance is obtained.

Capacitor element 10 is formed of a wound body as illustrated in FIG. 2. The wound body is a semi-manufactured product of capacitor element 10 and refers to a capacitor element in which a solid electrolyte layer has not yet been formed between anode body 21 on a surface of which a dielectric layer is provided and cathode body 22. The wound body includes anode body 21 connected to lead tab 15A, cathode body 22 connected to lead tab 15B, and separator 23.

Anode body 21 and cathode body 22 are wound with separator 23 interposed between anode body 21 and cathode body 22. An outermost periphery of the wound body is fixed with fastening tape 24. FIG. 2 shows partially developed wound body before the outermost periphery of the wound body is fixed.

Anode body 21 includes a metal foil whose surface is roughened so as to have projections and recesses, and the dielectric layer is formed on the metal foil having the projections and recesses. The conductive polymer is attached to at least a part of a surface of the dielectric layer to form the solid electrolyte layer. The solid electrolyte layer may cover at least a part of a surface of cathode body 22 and/or at least a part of a surface of separator 23. Capacitor element 10 in which the solid electrolyte layer has been formed is housed in an outer case together with the electrolytic solution.

<<Method for Producing Electrolytic Capacitor>>

Hereinafter, described are steps of one exemplary method for producing the electrolytic capacitor according to the present exemplary embodiment.

(i) Step of Preparing Anode Body 21 with Dielectric Layer

First, a metal foil as a raw material for anode body 21 is prepared. A type of the metal is not particularly limited, but it is preferable to use a valve metal such as aluminum, tantalum, or niobium, or an alloy including a valve metal, from the viewpoint of facilitating formation of the dielectric layer.

Next, a surface of the metal foil is roughened. By the roughening, a plurality of projections and recesses are formed on the surface of the metal foil. The roughening is preferably performed by etching the metal foil. The etching may be performed by, for example, a direct-current electrolytic method or an alternating-current electrolytic method.

Next, a dielectric layer is formed on the roughened surface of the metal foil. A method for forming the dielectric layer is not particularly limited, and the dielectric layer can be formed by subjecting the metal foil to an anodizing treatment. The anodizing treatment is performed by, for example, immersing the metal foil in an anodizing solution such as an ammonium adipate solution followed by a heat treatment. The anodizing treatment may also be performed by applying a voltage to the metal foil that has been immersed in the anodizing solution.

Normally, a large foil of, for example, a valve metal (metal foil) is subjected to the roughening treatment and the anodizing treatment from the viewpoint of mass productivity. In this case, the treated foil is cut into a desired size to prepare anode body 21.

(ii) Step of Preparing Cathode Body 22

A metal foil can be used for cathode body 22 as with the anode body. A type of the metal is not particularly limited, but it is preferred to use a valve metal such as aluminum, tantalum, or niobium, or an alloy including a valve metal. A surface of cathode body 22 may be roughened as necessary.

(iii) Manufacturing of Wound Body

Next, anode body 21 and cathode body 22 are used to manufacture a wound body.

First, anode body 21 and cathode body 22 are wound with separator 23 interposed between anode body 21 and cathode body 22. At this time, the winding can be conducted while lead tabs 15A, 15B are rolled in anode body 21, cathode body 22, and separator 23, to cause lead tabs 15A, 15B to stand up from the wound body as illustrated in FIG. 2.

As a material for separator 23, a nonwoven fabric can be used that includes, as a main component, for example, synthetic cellulose, polyethylene terephthalate, a vinylon, or an aramid fiber.

A material for lead tabs 15A, 15B is not also particularly limited as long as the material is a conductive material. A material for lead wires 14A, 14B connected to lead tabs 15A, 15B, respectively, is not also particularly limited as long as the material is a conductive material.

Next, fastening tape 24 is disposed on an outer surface of cathode body 22 positioned at an outermost layer of wound anode body 21, cathode body 22, and separator 23, to fix an end of cathode body 22 with fastening tape 24. When anode body 21 is prepared by cutting a large metal foil, the wound body may further be subjected to an anodizing treatment in order to provide a dielectric layer on a cutting surface of anode body 21.

(iv) Step of Forming Capacitor Element 10

Next, the dielectric layer is impregnated with a polymer dispersion to form a film covering at least a part of the dielectric layer. The polymer dispersion contains a liquid component and a conductive polymer dispersed in the liquid component. The polymer dispersion may be a solution obtained by dissolving the conductive polymer in the liquid component, or a dispersion liquid obtained by dispersing particles of the conductive polymer in the liquid component. Next, the formed film is dried to volatilize the liquid component from the film, forming a dense solid electrolyte layer covering at least a part of the dielectric layer. The polymer dispersion is uniformly distributed in the liquid component to easily form a uniform solid electrolyte layer. Thus, capacitor element 10 can be obtained.

The polymer dispersion can be obtained by, for example, a method for dispersing the conductive polymer in the liquid component. Or the polymer dispersion can also be obtained by a method for polymerizing a precursor monomer in the liquid component and generating particles of the conductive polymer. Preferable examples of the polymer dispersion include, for example, poly(3,4-ethylenedioxythiophene) (PEDOT) doped with polystyrenesulfonic acid (PSS), i.e., PEDOT/PSS. An antioxidant for the conductive polymer may be added. However, it is unnecessary to use an antioxidant because PEDOT/PSS little oxidizes.

The liquid component may be water, a mixture of water and a nonaqueous solvent, or a nonaqueous solvent. The nonaqueous solvent is not particularly limited, and a protic solvent and an aprotic solvent can be used, for example. Examples of the protic solvent include alcohols such as methanol, ethanol, propanol, butanol, ethylene glycol, and propylene glycol, formaldehyde, and ethers such as 1,4-dioxane. Examples of the aprotic solvent include amides such as N-methylacetamide, N,N-dimethylformamide, and N-methyl-2-pyrrolidone, esters such as methyl acetate, and ketones such as methyl ethyl ketone.

The method for applying the polymer dispersion to a surface of the dielectric layer is preferably a method for immersing the wound body in the polymer dispersion housed in a container because the method is simple. An immersion period depends on a size of the wound body, but ranges, for example, from 1 second to 5 hours, inclusive, preferably from 1 minute to 30 minutes, inclusive. In addition, impregnation is preferably performed under a reduced pressure, in a pressure of an atmosphere ranging, for example, from 10 kPa to 100 kPa, inclusive, preferably from 40 kPa to 100 kPa, inclusive. Further, ultrasonic vibration may be applied to the wound body or the polymer dispersion while the wound body is immersed in the polymer dispersion. The drying after picking the wound body up from the polymer dispersion is performed at a temperature ranging preferably from 50° C. to 300° C., inclusive, more preferably 100° C. to 200° C., inclusive, for example.

The step of applying the polymer dispersion to the surface of the dielectric layer and the step of drying the wound body may be repeated two or more times. These steps can be performed a plurality of times to increase coverage of the solid electrolyte layer on the dielectric layer. In the steps, the solid electrolyte layer may be formed on not only the surface of the dielectric layer but also surfaces of cathode body 22 and separator 23.

As described above, the solid electrolyte layer is formed between anode body 21 and cathode body 22 to manufacture capacitor element 10. The solid electrolyte layer formed on the surface of the dielectric layer virtually functions as a cathode material.

(v) Step of Impregnating Capacitor Element 10 with Electrolytic Solution

Next, capacitor element 10 is impregnated with an electrolytic solution. This provides an electrolytic capacitor excellent in a repairing function of a dielectric layer. A method for impregnating capacitor element 10 with an electrolytic solution is not particularly limited. For example, a method for immersing capacitor element 10 in the electrolytic solution housed in a container is simple and preferred. An immersion period depends on a size of capacitor element 10, and ranges, for example, from 1 second to 5 minutes, inclusive. Impregnation is preferably performed under a reduced pressure, in a pressure of an atmosphere ranging, for example, from 10 kPa to 100 kPa, inclusive, preferably from 40 kPa to 100 kPa, inclusive.

(iv) Step of Encapsulating Capacitor Element

Next, capacitor element 10 is encapsulated. Specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or alloys of these metals.

Next, sealing member 12 formed so as to allow lead wires 14A, 14B to penetrate the sealing member is disposed above capacitor element 10 to encapsulate capacitor element 10 in bottomed case 11. Next, bottomed case 11 is, at a part near an opening end, processed by transverse drawing, and is, at the opening end, curled to swage sealing member 12. Then, base plate 13 is disposed on a curled part of the bottomed case to complete the electrolytic capacitor as illustrated in FIG. 1. Then, an aging treatment may be performed while a rated voltage is applied.

In the exemplary embodiment described above, a wound electrolytic capacitor has been described. The application range of the present disclosure, however, is not limited to the wound electrolytic capacitor and can also be applied to other electrolytic capacitors such as a chip electrolytic capacitor including a metal sintered body as an anode body, and a laminated electrolytic capacitor including a metal plate as an anode body.

EXAMPLES

Hereinafter, the present disclosure is described in more detail with reference to examples. The present disclosure, however, is not to be considered limited to the examples.

Examples 1 to 6

In the present example, a wound electrolytic capacitor (Φ: (diameter) 8.0 mm×L (length): 12.0 mm) having a rated voltage of 100 V and a rated electrostatic capacity of 15 µF was produced. Hereinafter, a specific method for producing the electrolytic capacitor is described.

(Preparation of Anode Body)

A 100-μm-thick aluminum foil was subjected to etching to roughen a surface of the aluminum foil. Then, a dielectric layer was formed on the surface of the aluminum foil by an anodizing treatment. The anodizing treatment was performed by immersing the aluminum foil in an ammonium adipate solution and applying a voltage of 60 V to the aluminum foil. Then, the aluminum foil was cut into a size of 6 mm (length)×120 mm (width) to prepare an anode body.

(Preparation of Cathode Body)

A 50-μm-thick aluminum foil was subjected to etching to roughen a surface of the aluminum foil. Then, the aluminum foil was cut into a size of 6 mm (length)×120 mm (width) to prepare a cathode body.

(Manufacturing of Wound Body)

An anode lead tab and a cathode lead tab were connected to the anode body and the cathode body, respectively, and the anode body and the cathode body were wound with a separator interposed between the anode body and the cathode body while the lead tabs were rolled in the anode body, the cathode body, and the separator. Ends of the lead tabs protruding from the wound body were connected to an anode lead wire and a cathode lead wire, respectively. Then, the manufactured wound body was subjected to an anodizing treatment again to form a dielectric layer at a cutting end of the anode body. Next, an end of an outer surface of the wound body was fixed with a fastening tape to complete the wound body.

(Preparation of Polymer Dispersion)

A mixed solution was prepared by dissolving 3,4-ethylenedioxythiophene and a polymer dopant, i.e., polystyrenesulfonic acid (PSS, weight average molecular weight 100000) in ion-exchanged water (liquid component). While the mixed solution was stirred, iron (III) sulfate (oxidant) that had been dissolved in ion-exchanged water was added to the mixed solution to cause a polymerization reaction. After the reaction, a resultant reaction solution was dialyzed to remove unreacted monomers and an excessive oxidant, so that a polymer dispersion was obtained that contained about 5% by mass of polyethylene dioxythiophene doped with PSS (PEDOT/PSS).

(Formation of Solid Electrolyte Layer)

The wound body was immersed in the polymer dispersion housed in a predetermined container in a reduced-pressure atmosphere (40 kPa) for 5 minutes, and then the wound body was picked up from the polymer dispersion. Next, the wound body that had been impregnated with the polymer dispersion was dried in a drying furnace at 150° C. for 20 minutes to form a solid electrolyte layer covering at least a part of the dielectric layer.

(Impregnation with Electrolytic Solution)

An electrolytic solution containing ethylene glycol (EG) and polyethylene glycol (PEG) with a molecular weight of about 300 as glycol compounds and containing pyrogallol as the first aromatic compound to provide a composition as shown in Table 1 below was prepared. And a capacitor element was immersed in the electrolytic solution in a reduced-pressure atmosphere (40 kPa) for 5 minutes. A salt of the carboxylic acid (o-phthalic acid) and the base component (triethyl amine), which is triethylamine phthalate, was added as at least a part of the carboxylic acid.

TABLE 1

| Electrolytic capacitor | A1 | A2 | A3 | A4 | A5 | A6 |
|---|---|---|---|---|---|---|
| Proportions of respective components in solvent | | | | | | |
| EG (% by mass) | 60 | 60 | 60 | 60 | 60 | 60 |
| PEG (% by mass) | 20 | 20 | 20 | 20 | 20 | 20 |
| Glycerin (% by mass) | 20 | 20 | 20 | 20 | 20 | 20 |
| Total of solvent (% by mass) | 100 | 100 | 100 | 100 | 100 | 100 |
| Proportion of glycol compound in solvent (% by mass) | 80 | 80 | 80 | 80 | 80 | 80 |
| Proportion of EG in glycol compound (% by mass) | 75 | 75 | 75 | 75 | 75 | 75 |
| Proportion of PEG in glycol compound (% by mass) | 25 | 25 | 25 | 25 | 25 | 25 |
| Ratio of solute component vs 100 parts by mass of solvent | | | | | | |
| Triethylamine (parts by mass) | 2.2 | 2.2 | 1.0 | 2.2 | 0.05 | 2.2 |
| o-phthalic acid (parts by mass) | 0 | 0 | 0 | 0 | 0 | 5.2 |
| Pyrogallol (parts by mass) | 3 | 45 | 15 | 10 | 0.1 | 3 |
| Total of solute (parts by mass) | 5.2 | 47.2 | 16 | 12.2 | 0.15 | 10.4 |
| Proportion of base component in solute (% by mass) | 42.3 | 4.7 | 6.3 | 18 | 33.3 | 21.2 |
| Proportion of pyrogallol in solute (% by mass) | 57.7 | 95.3 | 93.7 | 82.0 | 66.7 | 28.8 |
| Proportion of o-phthalic acid in solute (% by mass) | 0 | 0 | 0 | 0 | 0 | 50 |
| Ratio of acid component with respect to 100 parts by mass of base component (parts by mass) | 136 | 2046 | 1500 | 455 | 200 | 373 |
| pH of electrolytic solution | 6.1 | 3.4 | 3.7 | 3.8 | 6.6 | 4.3 |
| Proportion of pyrogallol in electrolytic solution (% by mass) | 2.9 | 30.6 | 12.9 | 8.9 | 0.1 | 2.7 |
| Proportion of solute in electrolytic solution (% by mass) | 4.9 | 32.1 | 13.8 | 10.9 | 0.1 | 9.4 |

(Encapsulation of Capacitor Element)

The capacitor element that had been impregnated with the electrolytic solution was encapsulated to complete an electrolytic capacitor. Specifically, the capacitor element was housed in a bottomed case so that lead wires were positioned on an opening side of the bottomed case. And then a sealing member (an elastic material including a butyl rubber as a rubber component) that was formed so as to allow the lead wires to penetrate the sealing member was disposed above the capacitor element, so that encapsulate the capacitor element was encapsulated in the bottomed case. The bottomed case was, at a part near an opening end, processed by drawing and was further curled at the opening end, and a base plate was disposed on a curled part to complete electrolytic capacitors (A1 to A6) as shown in FIG. 1. Thereafter, an aging treatment was performed at 130° C. for 2 hours while a rated voltage was applied. The electrolytic capacitors A1 to A6 respectively correspond to Examples 1 to 6.

Comparative Example 1

Except for using no pyrogallol, and for using an electrolytic solution of composition as shown in Table 2, where the ratio of o-phthalic acid to 100 parts by mass of the solvent was changed to 4.2 parts by mass, an electrolytic capacitor B1 was prepared in the same way as in Example 6.

Comparative Example 2

Except for changing the ratio of pyrogallol to 100 parts by mass of the solvent to 0.5 parts by mass, and for using an electrolytic solution of composition as shown in Table 2, where the ratio of o-phthalic acid was changed to 1.6 parts by mass, an electrolytic capacitor B2 was prepared in the same way as in Example 6.

TABLE 2

| Electrolytic capacitor | B1 | B2 |
|---|---|---|
| Proportions of respective components in solvent | | |
| EG (% by mass) | 60 | 60 |
| PEG (% by mass) | 20 | 20 |
| Glycerin (% by mass) | 20 | 20 |
| Total of solvent (% by mass) | 100 | 100 |
| Proportion of glycol compound in solvent (% by mass) | 80 | 80 |
| Proportion of EG in glycol compound (% by mass) | 75 | 75 |
| Proportion of PEG in glycol compound (% by mass) | 25 | 25 |
| Ratio of solute component vs 100 parts by mass of solvent | | |
| Triethylamine (parts by mass) | 2.2 | 2.2 |
| o-phthalic acid (parts by mass) | 4.2 | 1.6 |
| Pyrogallol (parts by mass) | 0 | 0.5 |
| Total of solute (parts by mass) | 6.4 | 4.3 |
| Proportion of base component in solute (% by mass) | 34.4 | 51.2 |
| Proportion of pyrogallol in solute (% by mass) | 0 | 11.6 |
| Proportion of o-phthalic acid in solute (% by mass) | 65.6 | 37.2 |
| Ratio of acid component with respect to 100 parts by mass of base component (parts by mass) | 191 | 95.5 |
| pH of electrolytic solution | 4.7 | 7.1 |

TABLE 2-continued

| Electrolytic capacitor | B1 | B2 |
|---|---|---|
| Proportion of pyrogallol in electrolytic solution (% by mass) | 0 | 0.5 |
| Proportion of solute in electrolytic solution (% by mass) | 6.0 | 4.1 |

Examples 7 to 11

Electrolytic capacitors A7 to A11 were manufactured in the same manner as in Example 1 except that the composition of the solvent were changed as shown in Table 3, and the evaluation was performed in the same manner.

TABLE 3

| Electrolytic capacitor | A7 | A8 | A9 | A10 | A11 |
|---|---|---|---|---|---|
| Proportions of respective components in solvent | | | | | |
| EG (% by mass) | 80 | 50 | 40 | 30 | 20 |
| PEG (% by mass) | 20 | 25 | 10 | 10 | 20 |
| Glycerin (% by mass) | 0 | 25 | 50 | 60 | 60 |
| Total of solvent (% by mass) | 100 | 100 | 100 | 100 | 100 |
| Proportion of glycol compound in solvent (% by mass) | 100 | 75 | 50 | 40 | 40 |
| Proportion of EG in glycol compound (% by mass) | 80 | 67 | 80 | 75 | 50 |
| Proportion of PEG in glycol compound (% by mass) | 20 | 33 | 20 | 25 | 50 |
| Ratio of solute component vs 100 parts by mass of solvent | | | | | |
| Triethylamine (parts by mass) | 2.2 | 2.2 | 2.2 | 2.2 | 2.2 |
| o-phthalic acid (parts by mass) | 0 | 0 | 0 | 0 | 0 |
| Pyrogallol (parts by mass) | 3 | 3 | 3 | 3 | 3 |
| Total of solute (parts by mass) | 5.2 | 5.2 | 5.2 | 5.2 | 5.2 |
| Proportion of base component in solute (% by mass) | 42.3 | 42.3 | 42.3 | 42.3 | 42.3 |
| Proportion of pyrogallol in solute (% by mass) | 57.7 | 57.7 | 57.7 | 57.7 | 57.7 |
| Proportion of o-phthalic acid in solute (% by mass) | 0 | 0 | 0 | 0 | 0 |
| Ratio of acid component with respect to 100 parts by mass of base component (parts by mass) | 136 | 136 | 136 | 136 | 136 |
| pH of electrolytic solution | 6.2 | 6.1 | 6.1 | 6.2 | 6.1 |
| Proportion of pyrogallol in electrolytic solution (% by mass) | 2.9 | 2.9 | 2.9 | 2.9 | 2.9 |
| Proportion of solute in electrolytic solution (% by mass) | 4.9 | 4.9 | 4.9 | 4.9 | 4.9 |

[Evaluation]

Electrostatic capacity, ESR, and a breakdown voltage (BDV) were measured for the resultant electrolytic capacitors. The breakdown voltage (BDV) was defined as a voltage measured when the voltage was applied at an increasing rate of 1.0 V/s and an excess current of 0.5 A flowed.

Further, in order to evaluate long term reliability, the electrolytic capacitor was retained at 125° C. for 5000 hours while a rated voltage was applied, and an increase rate in ESR (ΔESR) was evaluated. The increase rate ΔESR was represented by a ratio $(X/X_0)$ of a value of ESR (X) after retention for 5000 hours to an initial value $(X_0)$. Table 4 shows evaluation results.

TABLE 4

| Electrolytic capacitor | Electrostatic capacity (μF) | ESR (Ω) | BDV (V) | $X/X_0$ |
|---|---|---|---|---|
| A1 | 32.1 | 15.0 | 145.0 | 1.7 |
| A2 | 32.0 | 16.7 | 144.0 | 1.5 |
| A3 | 32.0 | 16.6 | 144.0 | 1.5 |
| A4 | 32.2 | 16.5 | 146.0 | 1.5 |
| A5 | 32.0 | 17.1 | 144.0 | 2.7 |
| A6 | 32.1 | 16.0 | 149.0 | 1.6 |
| A7 | 32.5 | 15.0 | 145.0 | 1.7 |
| A8 | 31.8 | 16.8 | 146.0 | 1.9 |
| A9 | 31.8 | 17.2 | 146.0 | 1.8 |
| A10 | 31.6 | 17.1 | 147.0 | 1.7 |
| A11 | 31.5 | 17.3 | 146.0 | 1.8 |
| B1 | 31.9 | 15.8 | 149.0 | 266.0 |
| B2 | 32.1 | 16.5 | 148.0 | 72.6 |

The present disclosure can be utilized for an electrolytic capacitor that includes a solid electrolyte layer covering at least a part of a dielectric layer, and an electrolytic solution.

What is claimed is:

1. An electrolytic capacitor comprising:
an anode body having a dielectric layer;
a solid electrolyte layer in contact with the dielectric layer of the anode body; and
an electrolytic solution, wherein:
the electrolytic solution contains a solvent and a solute,
the solvent contains a glycol compound,
the solute contains an acid component and a base component,
a mass of the acid component in the solute is greater than a mass of the base component in the solute,
the acid component contains a carboxylic acid and a first aromatic compound having a hydroxyl group,
a part of the carboxylic acid is derived from a salt of the carboxylic acid component and the base component,
the glycol compound contains ethylene glycol, and
a proportion of ethylene glycol in the glycol compound is 30% by mass or more.

2. The electrolytic capacitor according to claim 1, wherein a proportion of the glycol compound in the solvent is 50% by mass or more.

3. The electrolytic capacitor according to claim 1, wherein the electrolytic solution has a pH of 4 or less.

4. The electrolytic capacitor according to claim 1, wherein the first aromatic compound has two or more hydroxyl groups.

5. The electrolytic capacitor according to claim 4, wherein the first aromatic compound is at least one selected from a group consisting of catechol and pyrogallol.

6. The electrolytic capacitor according to claim 1, wherein a proportion of the first aromatic compound in the electrolytic solution ranges from 0.1% by mass to 30% by mass, inclusive.

7. The electrolytic capacitor according to claim 1, wherein a proportion of the solute in the electrolytic solution ranges from 2% by mass to 32% by mass, inclusive.

8. The electrolytic capacitor according to claim 1, wherein the carboxylic acid contains a second aromatic compound having two or more carboxyl groups.

9. The electrolytic capacitor according to claim 8, wherein the second aromatic compound is at least one selected from a group consisting of o-phthalic acid and pyromellitic acid.

10. The electrolytic capacitor according to claim 1, wherein the base component is at least one selected from a group consisting of a primary amine, a secondary amine, and a tertiary amine.

11. The electrolytic capacitor according to claim 1, wherein the solid electrolyte layer contains a conductive polymer and a polymer dopant.

12. The electrolytic capacitor according to claim 1, wherein the glycol compound further contains polyethylene glycol.

13. The electrolytic capacitor according to claim 12, wherein an amount of ethylene glycol is equal to or more than an amount of polyethylene glycol.

* * * * *